United States Patent [19]

Zarian et al.

[11] Patent Number: 5,225,166

[45] Date of Patent: Jul. 6, 1993

[54] METHOD, APPARATUS AND COMPOSITION OF MATTER FOR A HIGH TEMPERATURE PLASTIC LIGHT CONDUIT

[75] Inventors: Jamshid J. Zarian, Woodland Hills; John A. Robbins, Canoga Park, both of Calif.

[73] Assignee: Lumenyte International Corporation, Costa Mesa, Calif.

[21] Appl. No.: 596,071

[22] Filed: Oct. 11, 1990

Related U.S. Application Data

[60] Division of Ser. No. 300,202, Jan. 23, 1989, which is a continuation of Ser. No. 883,350, Jul. 8, 1986, abandoned.

[51] Int. Cl.⁵ .......................... G05D 23/00; C08F 2/00
[52] U.S. Cl. ................................. 422/109; 422/106; 422/138; 422/202; 165/146
[58] Field of Search ........................ 422/198–205, 422/146, 138, 119, 106, 200, 202, 109; 165/146

[56] References Cited

U.S. PATENT DOCUMENTS

| | | | |
|---|---|---|---|
| 2,057,674 | 10/1936 | Fields | 248/500 |
| 3,130,447 | 4/1964 | Karl et al. | 422/106 |
| 3,641,332 | 2/1972 | Reick | 362/32 |
| 3,762,880 | 10/1973 | Tisdel et al. | 422/106 |
| 3,909,207 | 9/1975 | Bir | 422/138 |
| 4,177,240 | 12/1979 | Dal Bianco | 422/138 |
| 4,361,538 | 11/1982 | Dicoi et al. | 422/138 |

Primary Examiner—Robert J. Warden
Assistant Examiner—Christopher Y. Kim
Attorney, Agent, or Firm—Small Larkin Kidde & Golant

[57] ABSTRACT

A plastic light conduit of cross-linked polymer material having good light transmitting characteristics, without voids or noticeable bubbles, is disclosed. Also disclosed is a method of manufacture and an apparatus, involving progressive heating of reactive monomer mixture in a tube which is submerged in a progressive reactor utilizing cold oil to maintain a cold, non-reacting zone, and hot water to create a hot zone that causes reaction, while simultaneously carrying away the excess exothermic heat of reaction.

13 Claims, 2 Drawing Sheets

METHOD, APPARATUS AND COMPOSITION OF MATTER FOR A HIGH TEMPERATURE PLASTIC LIGHT CONDUIT

This application is a divisional of application Ser. No. 07/300,202 filed Jan. 23, 1989, which is a continuation of application Ser. No. 07/883,350, filed Jul. 8, 1986, now abandoned.

BACKGROUND OF THE INVENTION

1. Field of the Invention

The present invention relates to plastic light conduits, or fiber optics, and a method and apparatus for making them. More specifically, the present invention relates to a high temperature plastic light conduit, having good light transmitting characteristics, low light leakage, few, if any flaws, that does not melt, even above 150° C., to about 350° C., and which remains flexible indefinitely. The present invention also relates to a method and apparatus for making such a light conduit.

2. Description of the Prior Art

Increasingly, light conduits are used in a wide variety of applications. Glass-fiber light conduits are commonly used in communications, and for low level illumination purposes over short distances. Efforts to use such glass-fiber light conduits for general or specialized illumination have been largely unsuccessful because such fibers are expensive, small in diameter, brittle, heavy, and will not transmit large quantities of light under ordinary conditions. The amount of light transmitted by glass-fiber light conduits can be increased by bundling a large number of glass fibers into a single light conduit, allowing the light conduit to transmit a greater quantity of light. Such bundles are, however, expensive to manufacture and the adhesives used to bind the individual glass fibers together break down in the presence of oxygen at temperatures of approximately 250° C., to about 350° C., which are commonly produced by ordinary incandescent lamps. In addition, even such bundles are limited to a maximum size of approximately one-half inch to three-quarters inch in diameter. Furthermore, a light conduit for general illumination does not require the fine properties of glass-fiber light conduits.

Many efforts to provide an inexpensive, more flexible, and durable light conduit for general illumination have been made. These efforts led to plastic light conduits, usually consisting of thermoplastic polymers. Most conventional plastic optical fibers comprise a core of poly(styrene) or poly(methylmethacrylate), which cannot withstand temperatures above about 80° C. At higher temperatures of about 80° C., these light conduits shrink, drawing the tip of the fiber away from the focal point of the lamp and reducing the amount of light transmitted, and then melt into a viscous liquid, which terminates the light transmitting capabilities of the light conduit. Moreover, in the presence of oxygen and temperatures of about 120° C., such light conduits become brittle and discolored, typically turning amber or brown, which discolors and severely attenuates the light they transmit.

One effort to overcome these difficulties is explored in U.S. Pat. No. 4,505,543, which advances the prior art by adding a quantity of styrene derivative selected from the group consisting of p-phenylstyrene, p-tert-butylstyrene, p-cyanostyrene, p-iodostyrene, a,b,b-trifluorostyrene, perfluorostyrene, and 2,3,4,5,6-pentafluorostyrene to the conventional recipe, thereby increasing the temperature at which shrinkage begins to more than about 100° C. Like the prior art from which it is derived, however, U.S. Pat. No. 4,505,543 is a thermoplastic light conduit, produced through bulk polymerization to a polymerization degree of substantially 100%, which is subsequently re-melted and then spun into a light conduit through a ram extruder.

Another example of a thermoplastic light conduit is set forth in U.S. Pat. No. 3,993,834, which discloses a methyl methacrylate polymer core, produced by continuous bulk polymerization, and subsequent removal of volatile contents, using alkyl acrylates to co-polymerize with methyl methacrylate A free radical initiator, such as butyl peroxide is added to the co-polymer, typically comprising methyl methacrylate at 85% by weight, and up to 20% by weight of units derived from at least one alkyl acrylate and/or alkyl methacrylate other than methyl methacrylate, to produce a polymer, which is stripped of volatile contents through conventional means, and then is extruded through an appropriate die, while molten, to be formed into desired shapes such as pellets. The product of this process is then melted and extruded through a spinneret to produce a light conduit. The resulting product has a degree of polymerization of about 65%. Obviously, the product must be thermoplastic, and therefore subject to the difficulties encountered with ordinary thermoplastic light conduits.

Another thermoplastic light conduit is disclosed in U.S. Pat. No. 3,930,103, which employs a core material of poly(methyl methacrylate) resin and a sheath of vinylidene flouride polymer. Like other light conduits of this type, it must be stretched to impart bending strength. In this particular case, the light conduits are stretched to 1.5 times their original length at 140° C., thereby thinning the light conduit and significantly decreasing the proportion of light transmitted through it. Such light conduits are also thermoplastic, and are formed by extrusion processes.

Other examples of thermoplastic organic polymer light conduits include U.S. Pat. Nos. 3,900,453 and 3,252,950. Such light conduits are ordinarily extruded, which requires that they be thermoplastic light conduits All of them are linear organic polymers, made from vinyl-type monomers and certain other ingredients, designed to stimulate and control polymerization.

All thermoplastic polymers capable of transmitting light, however, melt rapidly when exposed to heat in excess of about 120° C., at the most, after shrinking. Accordingly, they are wholly unsuitable for any application involving exposure to such temperatures. Although probably most desired applications of light conduits require them to operate in temperatures of less than 120° C., light must be transmit quantities of light required for many uses, and it is generally not possible to transmit significant amounts of light into a light conduit without also exposing the light conduit to temperatures well in excess of 120° C. Therefore, use of thermoplastic light conduits seriously limits the amount of light that can be shown into the light conduit, diminishing its utility.

In addition, plastic light conduits according to the prior art often have defects including voids, bubbles and trapped impurities. Such defects significantly diminish the ability of the light conduit to transmit light because they scatter and absorb the light, and may alter the transmitted light color temperature.

Voids in a light conduit create two media interfaces: conduit-to-air; and air-to-conduit. Highly significant amounts of light are lost at each interface. Some of the light is reflected back toward the light source and some is scattered out the sidewall of the light conduit. Bubbles cause the same effects. Although the effect of a single bubble is small, very often a prior art conduit is so filled with bubbles that much of the light is lost.

This prior art all involves thermoplastic polymers, which are linear chain-linked polymers. A polymer is a large units, known as monomers. The repetition of the monomer may be linear, much as a chain is linear, or branched with same morphology as linear polymers (both producing thermoplastic materials), or it may be interconnected or cross-linked to form three-dimensional networks of the repeat unit (which forms thermoset materials).

These two different classes of polymers, also recognized as thermoplastic and thermoset polymers, respectively, exhibit quite different physical properties. For example, crude rubber consists of long linear chains of isoprene molecules, typically upwards of 20,000 units long, which is very stretchable and very sensitive to heat. Vulcanization, typically performed with the aid of sulfur, converts the linear polymer chains into a network polymer of three dimensions, which greatly increases hardness and elasticity. In the same way, a cross-linked or thermoset organic polymer light conduit would have physical properties greatly superior to linear or thermoplastic polymer light conduits.

Thermoplastic polymers become soft when heated and hard when cooled. They usually melt at temperatures above about 80° C. to about 200° C. Additionally, a large number of thermoplastics tend to either oxidize and consequently deteriorate or de-polymerize and/or decompose to oligomers and/or monomers. Conversely, thermoset polymers become harder when exposed to increasing temperatures. They do not melt when exposed to temperatures in the 150° range. They strongly resist deterioration caused by heat in the absence of oxygen.

Therefore, a significant need exists for a light conduit that is lightweight, flexible, will not deteriorate with age, even though exposed to heat in excess of about 120° C. to about 350° C. at the tip that is exposed to the light and about 250° C. throughout its length, has good resistance to the surrounding environment, has good light transmission characteristics, does not shrink substantially, does not melt, oxidize or otherwise deteriorate when exposed to high temperatures, remains flexible, and is relatively easy and inexpensive to produce.

SUMMARY OF THE PRESENT INVENTION

Accordingly, it is an object of the present invention to provide a light conduit that satisfies these needs.

It is a further object of the present invention to meet these needs by providing a light conduit consisting of a cross-linked or thermoset organic polymer.

It is a further object of the present invention to provide such a light conduit that is housed in a protective sheath and isolated from oxygen.

It is a further object of the present invention to provide a method for making such a light conduit.

It is a further object of the present invention to provide an apparatus specifically adapted to manufacture of such light conduits and other polymer, co-polymer or other organic products (for example, polycarbonate rods) which progressive polymerization is desirable, and which offers a superior alternative to polymer casting, as currently performed.

These and other objects of the present invention are achieved by providing a cross-linked thermoset organic polymer light conduit, which, for example, may consist of (by volume) about 50 to 80 parts of methyl methacrylate, 20 to 80 parts of n-butyl methacrylate, 0.10 to 0.50 parts of isopropyl percarbonate, 1 to 80 parts of a cross-linking agent, (or about 1 to 5 parts of the cross-linking agent diallyl phthalate) and 0.5 to 5 parts of a chain transfer agent, such as n-butyl mercaptan. These ingredients are well mixed and sucked into a long tube, which will become the sheath of the product, and placed into a reactor where the mixture is progressively polymerized from one end to the other by heating the length of the tube progressively at a rate of about six inches to twenty-four inches per hour, at a temperature of about 35° C. to 80° C. for about 20 hours.

The resulting product is a thermoset polymer light conduit, having good light transmission characteristics, a high optical refractive index of greater than about 1.48, softness and pliability of a thermoset organic polymer that exhibits good flexibility for a monofilament with diameters of about 1/16 inch to about 1 inch.

Further novel features and other objects of the present invention will become apparent from the following detailed description, discussion and the appended claims, taken in conjunction with the drawing Figures.

BRIEF DESCRIPTION OF THE DRAWINGS

Referring particularly to the drawings for the purpose of illustration only and not limitation, there is illustrated.

DETAILED DESCRIPTION OF PREFERRED EMBODIMENTS

Figure 1:
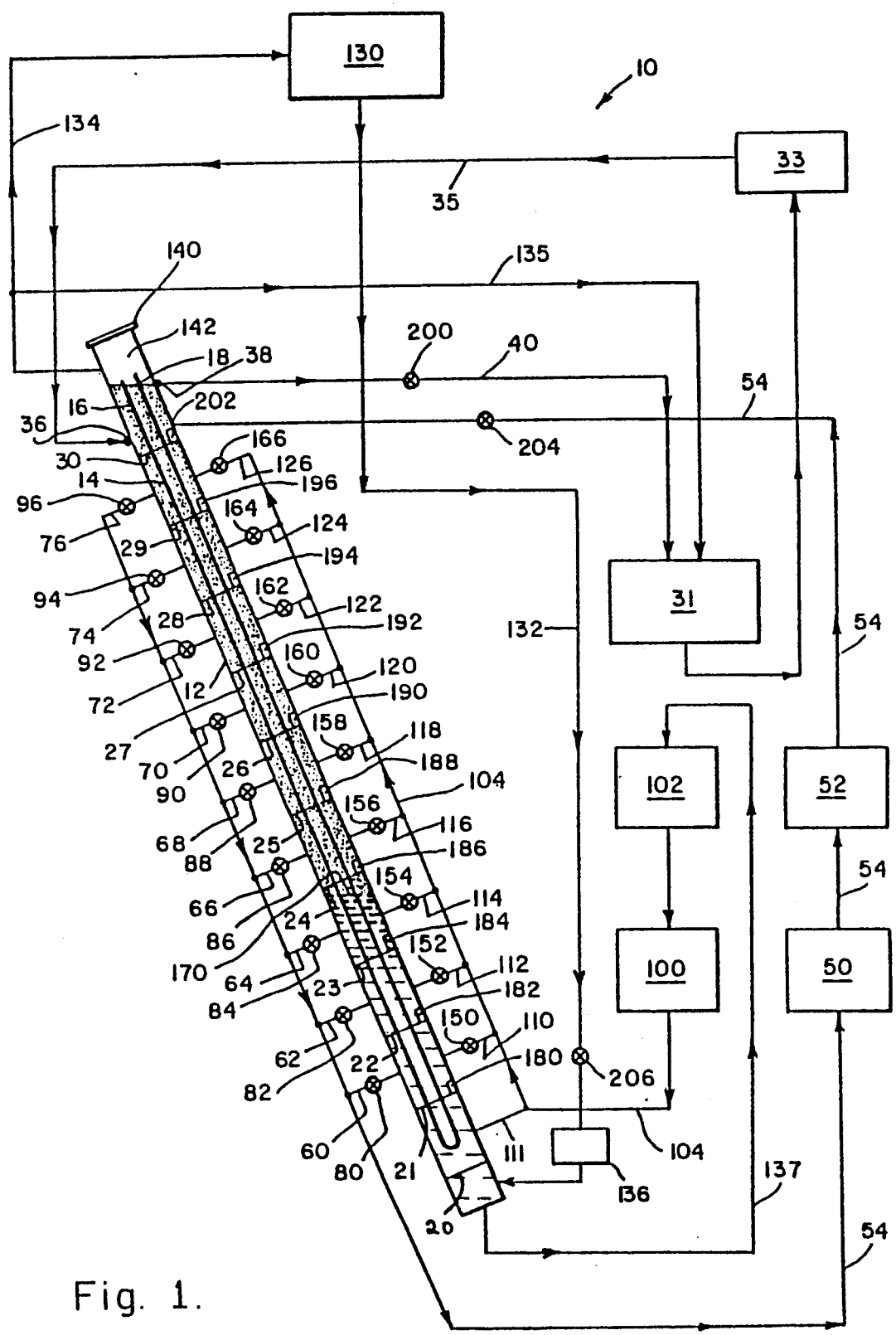
FIG. 1 is a schematic side elevation of an apparatus for carrying out the disclosed methods.

Although the present invention will now be described with reference to specific embodiments, such embodiments are described by way of example only and are merely illustrative of some of many possible specific embodiments which represent applications of the principles of the invention. Various changes and modifications obvious to one skilled in the art to which the invention pertains are deemed to be within the spirit, scope and contemplation of the invention, as further defined in the appended claims.

The present invention provides a cross-linked, that is, a thermoset organic polymer light conduit, having good light transmitting characteristics. It is important that the finished product be substantially transparent and transmit color truly, which requires a very high degree of purity and the absence of voids or bubbles. Further, it is desirable that the light conduit be flexible and readily withstand exposure to high temperatures for extended periods of time.

According to the present invention, it is necessary to choose ingredients which, when polymerized, produce a product having a high refractive index and good light transmission characteristics.

To produce such a product, the ingredients must be purified to insure that: (1) no impurities in the feed stock retard the polymerization reaction, and (2) there are no impurities, voids, or bubbles in the polymer mass after the reaction is completed, which would diminish the ability of the light conduit to transmit light.

Most chemical feedstocks are not 100% pure when they are received from the manufacturer. For example, methyl methacrylate, a highly reactive monomer, will self-polymerize upon exposure to high heat or light or in the presence of impurities. Therefore, manufacturers add small amounts of inhibitors to it to increase shelf life and ease of handling. These inhibitors retard polymerization and eventually impart a yellow tint to the light conduit. Therefore, the reactants must be purified prior to reacting. Conventional means for purifying such reactants have been developed. Such means include, for example, distillation under reduced pressure, alkaline wash, or recrystallization. Particulate impurities, such as solids, gels or dust are removed by filtration.

Poly (alkyl acrylates) and poly (alkyl methacrylates) have traditionally been employed in the preparation of light transmitting conduits, because of their inherent high refractive index, crystal clarity and high light transmission.

The poly (alkyl acrylates) and poly (alkyl methacrylates) comprise a large group of polymers. Table 1 lists a number of these homopolymers with their respective refractive indices and glass transition temperatures. If only the refractive indices of the corresponding homopolymers are known, then a rough estimate of the refractive index of a random copolymer may be obtained by interpolation with respect to the composition by weight of the constituent monomers. For the purposes of this invention, it is possible to compose copolymers with the desired refractive indices according to the refractive indices of homopolymers reported in the prior art.

The most widely used polymer of this family is poly (methyl methacrylate). Poly (methyl methacrylate) has a high refractive index, is highly transparent and crystal clear, all highly desired characteristics for light conduits, but has a high glass transition temperature (100° C.) as a homopolymer, which limits its usefulness in the production of light conduits larger than ⅜" in diameter. Methyl methacrylate can, however, be co-polymerized with other acrylate and methacrylate monomers such as ethyl acrylate or n-butyl methacrylate, which, as homopolymers, possess reported glass transition temperatures of −29° C. and 15° C. respectively, to produce a more flexible light conduit.

Therefore, by selection of certain monomers from the acrylic and methacrylate ester family according to their respective refractive indices and glass transition temperatures it is possible to obtain co-polymers which render the desired refractive index, light transmission, softness and flexibility.

TABLE 1

| | Refractive Index | Glass Transition Temp. °C. |
|---|---|---|
| poly (undecafluorohexyl acrylate) | 1.356 | −44 |
| poly (trifluoroethyl acrylate) | 1.407 | −15 |
| poly (trifluoroisopropyl methacrylate) | 1.418 | 76 |
| poly (trifluoroethyl methacrylate) | 1.437 | |
| poly (2-methoxyethyl acrylate) | 1.463 | |
| poly (tert-butyl methacrylate) | 1.464 | 113 |
| poly (ethyl acrylate) | 1.468 | −29 |
| poly (3-methoxypropyl acrylate) | 1.471 | −80 |
| poly (methyl acrylate) | 1.475 | 5 |
| poly (hexadecyl methacrylate) | 1.475 | 10 |
| poly (isobutyl methacrylate) | 1.477 | 48 |
| poly (n-butyl methacrylate) | 1.483 | 15 |
| poly (n-propyl methacrylate) | 1.484 | 30 |
| poly (ethyl methacrylate) | 1.485 | 60 |
| poly (methyl methacrylate) | 1.490 | 100 |

TABLE 1-continued

| | Refractive Index | Glass Transition Temp. °C. |
|---|---|---|
| poly (cyclohexal-alpha-ethoxyacrylate) | 1.497 | 14 |
| poly (2-methylcyclohexyl methacrylate) | 1.503 | 78 |
| poly (2-hydroxyethyl methacrylate) | 1.512 | 50 |
| poly (1,3-dichloropropyl methacrylate) | 1.527 | |
| poly (furfuryl methacrylate) | 1.538 | |
| poly (isopropyl methacrylate) | 1.552 | 76 |
| poly (benzyl methacrylate) | 1.568 | 49 |
| poly (phenyl methacrylate) | 1.571 | 105 |
| poly (1,2-diphenylethyl methacrylate) | 1.581 | |
| poly (diphenylmethyl methacrylate) | 1.593 | |
| poly (phenyl-alpha-bromoacrylate) | 1.612 | |
| poly (beta-napthyl methacrylate) | 1.630 | |
| poly (alpha-napthyl methacrylate) | 1.641 | |
| poly (pentabromophenyl methacrylate) | 1.710 | |

The present invention is not limited to the poly(acrylics), poly(methacrylics) or alpha- and beta-substituted poly(acrylics) and poly(methacrylics) or combinations thereof. It is possible to compose formulations based on poly(styrenes) and/or derivatives of poly(styrenes), poly(vinyl esters), poly(carbonates), poly(esters) in combination thereof. The limiting factors are: low refractive index, low light transmission, and low flexibility, which are inherent to monomers.

The monomer base, consisting of a mixture of preselected monomers, is then altered to produce a cross-linked thermoset polymer by adding a multifunctional monomer such as diallyl phthalate, triallyl cyanuarate, dimethallyl maleate, ethylene dimethacrylate.

A multifunctional monomer for the purpose of this invention is defined as a molecule which contains two or more double bonds, such as allyl pendant, diacrylate or dimethacrylate groups, whereby each double bond can independently become an active site and subsequently capable of participating in a growing polymer chain, while the other active site may facilitate the formation of branched polymer which grows and eventually connects to a growing chain and creates a cross-linked polymer. Multifunctional monomers possessing more than two double bonds, such as triallyl cyanurate, pentacrythritol tetracrylate, or trimethylpropane trimethacrylate are capable of producing highly cross-linked structures.

Sufficient amounts of a cross-linking agent will impart these characteristics to the polymer: it raises the softening point, improves infusibility and solubility, reduces creep, and increases toughness. Table 2 lists a number of cross-linking agents that can be used according to the present invention.

TABLE II

| Cross-Linking Agents |
|---|
| Allyl Diglycol Carbonate |
| Bis (2-methacryloxyethyl) Isophthalate |
| Bis (allylyl) Carbonate |
| Bis (2-methacryloxyethyl) Phthalate |
| Bis (2-methacryloxyethyl) Terphthalate |
| 1,4-Butanediol Diacrylate |
| 1,4-Butanediol Dimethacrylate |
| 2-Butene 1,4-Diacrylate |
| 2-Butene 1,4-Dimethacrylate |
| 1,3-Butylene Glycol Diacrylate |
| 1,4-Butylene Glycol Diacrylate |
| 1,3-Butylene Glycol Dimethocrylate |
| 1,4-Butylene Glycol Dimethocrylate |
| Diallyl Adipate |
| Diallyl Carbonate |
| Diallyl Fumarate |
| Diallyl Isocyanate |

TABLE II-continued

Cross-Linking Agents

Diallyl Isophthalate
Diallyl Maleate
Diallyl Malonate
Diallyl Phthalate
Diallyl Terephthalate
Diethylene Glycol Diacrylate
Dimethallyl Maleate
Divinylbenzene
Ethylene Diacrylate
Ethylene Dimethacrylate
1,6-Hexamethylene Diacrylate
1,6-Hexamethylene Dimethacrylate
Methallyl Acrylate
Methallyl Methacrylate
Neopentyl Glycol Diacrylate
1,9-Nonanediol Diacrylate
1,9-Nonanediol Dimethacrylate
Pentacrythediol Tetracrylate
Pentacrythediol Tetramethacrylate
1-Phenylethylene-1,2-Dimethacrylate
p-Phenylene Dimethocrylate
2,3-Proplyene Glycol Dimethacrylate
Styrene Glycol Dimethacrylate
Tetraethylene Glycol Diacrylate
Tetraethylene Glycol Dimethacrylate
Tetramethylene Diacrylate
Tetramethylene Dimethocrylate
Triallyl Cyanurate
Triallyl Trimesate
Triethylene Glycol Diacrylate
Triethylene Glycol Dimethacrylate
Trimethelolethane Trimethacrylate
Trimethylpropane Trimethacrylate Preferred multifunctional cross-linking agents for the present invention are: diallyl phathalate, a current product of FMC Corporation Organic Chemicals Division marketed as DAP, 1,3-butylene dimethacrylate (monomer X-970) and trimethylpropane trimethacrylate (monomer X-980), both currently produced by Rohm and Haas Company Industrial Chemicals Division. It is also possible to use multifunctional monomers, to the extent that they actually comprise a substantial portion of the thermoset polymer mass.

For example, it is possible to successfully incorporate as much as 30% by volume of diethylene glycol bis (allyl carbonate), currently marketed as CR-39 by PPG Industries, Inc. Organic Chemicals Division, into a recipe, therefore eliminating the need for a cross-linking agent. Diethylene glycol bis (allyl carbonate) contains two allyl radicals capable of introducing efficient cross-linking to a polymer mass. The proportion of diethylene glycol bis (allyl carbonate) can be increased up to 80% by volume, but the resulting light conduit is not firm at this extreme.

A recipe containing up to 15% by volume of 1,3-butylene dimethacrylate produced reasonably good quality light conduit. Suitable cross-linking agents or multifunctional monomers are not limited to the ones specifically mentioned herein.

The unsaturated monomers employed in the present invention can all be polymerized by free radical initiation. An initiator of this type upon heating or exposure to ultraviolet radiation decomposes into free radicals (organic molecules containing an unpaired electron). For the purpose of this invention an efficient initiator was so chosen that: it could be decomposed completely at low temperature, required low or no induction period, had a constant rate of heat evolution, had a linear conversion rate, left no initiator residues, and did not impart any color to the light conduit. Table III includes a list of suitable initiators, the solvent employed for determination of half life, temperature and the decomposition rate constants $k_d$ which is related to half life $(t_{\frac{1}{2}})$ by the following equation $$t_{\frac{1}{2}} = 0.693/k_d$$

| Initiator | Solvent | T, °C. | $k_d$, 1/sec |
|---|---|---|---|
| 2,2'-azo-bis-isobutyronitrile | benzene | 70 | $3.1 \times 10^{-5}$ |
|  | methyl methacrylate | 70 | $1.27 \times 10^{-4}$ |
|  | styrene | 70 | $4.72 \times 10^{-5}$ |
| 2,2-azo-bis-2-propyl-butyronitrile | nitrobenzene | 80 | $2.55 \times 10^{-4}$ |
| 2-phenylethyl-azo-methane | diphenyl ether | 151 | $4.35 \times 10^{-5}$ |
| azo-bis(1-carbomethoxy-3-methyl propane) | benzene | 36 | $3.05 \times 10^{-7}$ |
| 1,1'-azo-bis-cumene | benzene | 59 | $1.94 \times 10^{-4}$ |
| isopropyl peroxide | styrene | 60 | $6.01 \times 10^{-10}$ |
| tert-butyl peroxide | benzene | 80 | $7.81 \times 10^{-8}$ |
|  |  | 135 | $6.19 \times 10^{-5}$ |
| isobutyryl peroxide | benzene | 40 | $2.38 \times 10^{-4}$ |
| benzoyl peroxide | benzene | 60 | $2.76 \times 10^{-6}$ |
|  |  | 70 | $1.38 \times 10^{-5}$ |
|  |  | 80 | $4.39 \times 10^{-5}$ |
|  |  | 100 | $2.28 \times 10^{-4}$ |
| phenylacetyl peroxide | benzene | 20 | $4.76 \times 10^{-4}$ |
| tert-butyl hydroperoxide | benzene | 182 | $8.1 \times 10^{-5}$ |
| methyl ethyl ketone peroxides | ethyl acetate | 70 | $1.28 \times 10^{-6}$ |
| tert-butyl perbenzoate | benzene | 100 | $1.07 \times 10^{-5}$ |
| potassium persulfate | water | 80 | $6.89 \times 10^{-5}$ |
| diisopropyl peroxydicarbonate | benzene | 40 | $4.86 \times 10^{-5}$ |
|  |  | 50 | $1.39 \times 10^{-4}$ |
|  |  | 60 | $5.83 \times 10^{-4}$ |
| di-sec-butyl peroxydicarbonate | benzene | 40 | $3.31 \times 10^{-5}$ |
|  |  | 50 | $1.21 \times 10^{-4}$ |
|  |  | 60 | $3.63 \times 10^{-4}$ |
| di-n-propyl peroxydicarbonate | benzene | 40 | $2.91 \times 10^{-5}$ |
|  |  | 50 | $9.92 \times 10^{-4}$ |
|  |  | 60 | $3.50 \times 10^{-4}$ |

Peroxydicarbonates, such as diisopropyl, di-sec-butyl and di-n-propyl peroxydicarbonates (IPP, SBP and NPP) have the advantage of providing free radicals at considerably lower reaction temperatures, in comparison with most other types of free radical initiators. IPP, SBP and NPP are all currently marketed by PPG Industries Inc., Organic Chemicals Divisions. IPP is the preferred initiator for this invention. In addition, 2,2'-azo-bis-isobutyronitrile and benzoil peroxide also were extremely useful, when IPP, SBP, or NPP phase separated from the monomer mixture during the course of polymerization. Excessive amounts of initiator imparted a yellow tint to the polymeric light conduit.

Finally, a chain transfer agent such as n-butyl mercaptan, or lauryl mercaptan was added in small proportions to control the propagation of the polymerization. Utilization of chain transfer agents such as mercaptans is well understood in the production of linear polymers, but not in cross-linked polymers. It has been found, however, according to the present invention, that chain transfer agents can provide significant benefits to cross-linked polymer, or copolymer production processes. Because of the duration of the polymerization reaction in the present invention and because of vastly different reactivity ratios of the monomers, chain transfer agents help to control the reaction by retarding the quick propagation of more active monomers (which is undesirable) due to the formation of block copolymers, which may introduce microstructures in the light conduit. Such microstructures subsequently cause significant inefficiency and attenuation in light transmission. Further, any erratic propagation of the polymerization reaction changes the monomer composition of the immediately adjacent layer of monomers in the progressive polymerization process, causing inconsistent compositions in different sections of the light conduit. Such inconsistencies create a light conduit of segmented layers, each having a somewhat different index of refraction. This result is very similar to problems that can be encountered with drip-casting methods. Much light is lost at such interfaces and the result is a very inefficient light conduit.

A length of tube 14 filled with a reactive mixture, will not produce a high quality light conduit if it is entirely immersed in a high-temperature environment, which causes the entire length of the reactive mixture to polymerize simultaneously. This may cause bubbles or impurities introduced during mixing and filling to be trapped within the polymer matrix. In addition, localized polymerization may take place because of the uncontrolled reaction conditions.

Further, the exothermic heat of reaction of this bulk polymerization process cannot be carried away effectively, resulting in vaporization and formation of localized bubbles, polymerization because the product shrinks at the site of reaction by from about 10% to about 25% by volume) and so on.

Therefore, according to the present invention, only a very short length of tube 14 is newly subjected to reaction conditions at any one time, while the remainder of tube 14 is maintained at about $-10°$ C. to $20°$ C. to prevent any significant degree of reaction, although the preferred range is about $-10°$ C. to about $0°$ C. At temperatures below about $-10°$ C. there is phase separation between some commonly used monomers.

Referring to FIG. 1, there is shown an inventive apparatus for carrying out a method according to the present invention to produce compositions of matter according to the present invention, or according to the prior art. FIG. 1 illustrates reactor 10 having tank 12, for carrying out and controlling a reaction.

A reactive mixture according to the present invention, or other reactive mixture of monomers, is first sucked into a tube, such as tube 14, by a vacuum pump, as is well known in the prior art. Tube 14 is then doubled into a U-shaped tube whose open ends 16, 18 face upward to prevent the reactive mixture from running out of the tube, and is inserted into tank 12 of reactor 10.

Ideally, mixing the ingredients of a reactive mixture and filling the tubes should be done at a temperature of about $-10°$ C. to $0°$ C. It has been found, however, that if reactants are maintained at the low storage temperature prior to mixing, they can be exposed to room temperature for about an hour before being immersed in the cold oil of the reactor, and still the mixture will create a high quality polymer light conduit. An hour is sufficient to permit mixing the reactants and the filling of cladding tubes.

Eleven perforated tube support plates 20, 21, 22, 23, 24, 25, 26, 27, 28, 29, 30 are fastened into tank 12 parallel to one another at equal spaced intervals perpendicular to the longitudinal axis of tank 12 to keep tube 14 from touching other similarly disposed tubes during the reaction, and to keep the tubes 14 substantially straight. Tube support plates 20, 21, 22, 12, 24, 25, 26, 27, 28, 29, 30, include a plurality of apertures for threading tube 14 and other tubes through, thereby maintaining the spatial relationship and separation of tubes, and keeping the tubes substantially straight. This is important because if the tubes touch throughout the reaction, the exothermic heat of reaction is not properly transferred to the surrounding liquid media, resulting in defects in the finished light conduit.

It has been found, according to the present invention, that a superior product results when the reaction is carried out progressively from one end of the tube to another, which prevents voids by allowing the material in the tube to be drawn down and fall as the volume of the material shrinks during the reaction. Thus, the inventive method of the present invention is more nearly related to casting than to the extrusion or spinning techniques commonly employed with the thermoplastic light conduits, rods, pipes or tubes in the prior art, from which the present method is entirely distinct. According to the prior art, a progressively formed light conduit was made by dripping reactive solution into a containment tube immersed in a hot bath. According to the present invention, however, it has been found that a vastly superior product results if all the reactive mixture is placed, in the tube at the same time, and then progressively reacted.

It is desirable that all ingredients employed in the present invention become an integral part of the polymer mass. Due to the nature of the reaction and duration of the polymerization, any materials that are not polymerizable or are not active enough, such as impurities, for example, get pushed up by increase in the viscosity of the prior polymerizing layer.

It is also important that all of the ingredients be mutually soluble in one another, and that they remain mixed. The process of production of a light conduit according to the present invention (as currently practiced, see next paragraph) takes from twenty to thirty hours to react a tube about 20 feet long. That is, the reaction proceeds at the rate from about 10 inches to about two linear feet per hour, with the preferred rate being about one foot per hour. The ingredients must remain well mixed during the production. Immiscibility of the ingredients may cause either cloudiness through phase separation, block copolymerization, or localized polymerization containing unreacted ingredients which cannot react because of high viscosity.

A reactor 10 capable of manufacturing commercial quantities of light conduit, may have a tank about 6 inches to 10 inches in diameter, and about 30 feet long, and a fluid capacity of about 40 to 120 U.S. gallons. About two dozen light conduits of about ⅜ of an inch to about ½ inch in diameter, and about 20 feet long each, comprising 1 dozen 40-foot long tubes, filled with reactive mixture, bent in two in the middle; can be produced in one batch.

At the beginning of a batch production cycle, tank 12 is filled with oil. The oil may be mineral oil or any other light oil that conducts heat well, flows well at low temperatures, and has a lower density than water, and therefore floats on water. Oil pump 33 pumps oil from oil reservoir 31, through oil transfer line 35 and oil inlet 36 at the top of tank 12, into tank 12, until oil reaches oil overflow outlet 38, and oil overflow line 40, through which the oil returns to oil reservoir 31. Oil pump 33 is turned off when oil overflows through oil overflow outlet 38, signalling that tank 12 is full. This filling procedure and termination may be either automatically or manually controlled. Oil inlet 36 is about eight inches below oil overflow outlet 38. Oil pump 33 pumps about 5 to 10 gallons per minute. Filling tank 12 with oil is in preparation for processing a batch of light conduits.

Next, oil from tank 12 is cooled by oil reservoir and cooler 50 and pumped upward by oil circulation pump 52 through oil circulation line 54, and into tank 12, and is subsequently withdrawn through oil distribution lines 60, 62, 64, 66, 68, 70, 72, 74, 76, and each respective associated oil valve 80, 82, 84, 86, 88, 90, 92, 94, 96, from which the oil flows back into tank 12. The oil is continually circulated within tank 12 via oil circulation line 54 through oil cooler 50, oil circulation pump 52 and the oil distribution lines and respective associated oil valves until the oil reaches the desired temperature of $-10°$ C. to $0°$ C. Alternatively, the oil may be cooled by any conventional means prior to being pumped into tank 12.

Oil circulation pump 52 replaces the entire oil volume in tank 12 every two to three minutes, maintaining a homogeneous temperature throughout tank 12, of which the resulting thermal gradients.

The state of reactor 10 now is as follows: Tank 12 is full of cold oil, which is withdrawn through distribution lines 60, 62, 64, 66, 68, 70, 72, 74, 76 and the associated oil valves 80, 82, 84, 86, 88, 90, 92, 94, 96, and returned to the oil reservoir and cooler 50 by oil pump 52. No water is in tank 12. Oil flow as described maintains a homogeneous temperature of about $-10°$ C. to $0°$ C. throughout the entire volume of tank 12.

As described above, the desired number of tubes 14 are filled with the desired reactive mixture, and are then placed inside tank 12 of reactor 10. Oil that is displaced by tubes 14 returns to oil reservoir 31 by gravity, via oil overflow line 40 (overflow valve 204 is open during the reaction cycle).

After tank 12 again reaches equilibrium temperature following insertion of the reactive mixtures in the tubes, heated water is introduced into tank 12 progressively from the bottom to the top of tank 12, progressively initiating the reaction The water circulation system comprises water heater 100, water pump 102, water inlet manifold 104, water distribution lines 110, 112, 114, 116, 118, 120, 122, 124, 156, 158, 160, 162, 164, 166, water feed tank 130, unheated water feed line 132, and water circulation return line 137. Water pressure equalization line 134 and oil pressure equalization line 135 are pressurized by nitrogen gas from head space 142 to maintain equal pressure in all fluid coupled parts of reactor 10 at all times during the reaction. Water flows through all these lines in the directions indicated by the arrows. Metering regulator 136 controls the volume of water flowing into tank 12.

In operation, after tank 12 is loaded, it is sealed by closing hatch 140 and is pressurized to a pressure of from about 40 psi to about 200 psi, depending on the characteristics desired in the finished product. This pressure is maintained by pressurized gas head space 142.

It is important that the reactive mixtures not be exposed to oxygen during the reaction, so nitrogen is a preferred gas for filling head space 142, and pressurizing tank 12, oil reservoir 31 and water feed tank 130, and all other fluid coupled parts of reactor 10. The nitrogen pressure is equalized, at all times, between tank 12, oil reservoir 31 and water feed tank 130 through water pressure equalization line 134 and oil pressure equalization line 135.

The pressure in the system helps control the chemical reaction according to principles well known to those skilled in the art. The pressure increases the boiling point of the chemicals in the tank, preventing initiators and monomers from boiling, which would produce a chemically inferior product filled with bubbles and voids.

Heated water, having a temperature of from about 35° C. to about 120° C., depending on the desired characteristics of the end product and the specific mixture of reactive materials being reacted, is introduced to tank 12 through water circulation lines 110, 111, thereby heating a small end portion of tube 14, which initiates the polymerization or copolymerization reaction. Water valves 150, 152, 154, 156, 158, 160, 162, 164, 166 are all closed.

Water from water inlet manifold 104 circulates downwardly within tank 12, exiting through water circulation return line 137, where it is pumped by water pump 102 and heated by water heater 100 to the desired temperature, and then re-introduced into tank 12. Water is circulated in this manner at the rate of about 40 gallons per minute, thereby maintaining a completely homogeneous reactive temperature within the water-filled portion of tank 12.

Naturally, when water is introduced into the tank, the oil floats on top of the water. As water is added to tank 12 through successively higher water distribution lines, oil overflows from the tank through oil overflow outlet 38, and oil return line 40, so that the combined volume of oil and water within tank 12 remains constant.

The opening and closing sequences of these valves are controlled by electric relays, which are activated by a thermoswitch. Thermoswitches 180, 182, 184, 186, 188, 190, 192, 194, 196 are located inside tank 12 about half-way between adjacent water distribution lines, one said thermoswitch adjacent to each tube support plate 21, 22, 23, 24, 25, 26, 27, 28, 29, 30, respectively.

After tank 12 is filled with oil, loaded with mixture-filled tubes, and returned to its cold equilibrium temperature, the reaction is initiated by introducing hot water into tank 12 in the following manner. Oil valves 80, 82, 84, 86, 88, 90, 92, 94, 96 are open. It is important that substantially the same volume of oil passes through each valve, to promote uniform temperature and to reduce turbulence. All water valves are closed.

Unheated feedwater is metered slowly into tank 12 through regulator 136, at a rate of about 5400 cubic centimeters per hour, withdrawn through water circulation return line 137 by water pump 102, then heated by water heater 100 and introduced into water inlet manifold 104 and through water distribution line 111, which has no valve and is always open, into tank 12. This feedwater is the only source of water for filling tank 12.

In the present embodiment, about two feet of water is left standing in the bottom of the tank after each batch, providing the water to prime the water circulation system.

Even though water flowing into tank 12 through regulator 136 is unheated, this does not adversely affect temperature control of water within tank 12 because: (1) the rate of feedwater introduction is quite small compared to the total volume of tank 12; (2) the bottom two feet of tank 12 does not include any reactive mixture filled tubing; and (3) water entering through regulator 136 is sucked down into water return line 137 by low pressure created by water pump 102 before the unheated water can mix with heated water in tank 12. The regulator 136 is essentially ahead of water heater 100, and could be located at another point in the system.

When the heated water fills tank 12 to the level of thermoswitch 180 (physically below water distribution line 110), thermoswitch 180 sends an electric signal to a relay (not shown), which turns off oil valve 80. Heated water continues to rise. When the heated water reaches thermoswitch 182 (immediately below water distribution line 112), it triggers the respective relay, which opens water valve 150 and closes oil valve 82. Next, when heated water the corresponding relay opens water valve 152 and shuts off oil valve 84. It is important that any specific water distribution line is not turned on until the level of water inside tank 12 is above the specific water distribution line to reduce turbulence and maintain the sharp demarcation between the hot and cold zones of tank 12. Simultaneously, the displaced oil, which floats on the water, flows through oil outlet 38 and returns to oil reservoir tank 31 through line 40, via gravity.

In this manner, water is introduced to the lower portion of tank 12, through successively higher water distribution lines, the displaced cold oil is withdrawn in the same volume and the oil distribution lines are progressively shut down, one at a time, as the hot water rises in tank 12.

At all times, water flows through all open water distribution lines. That is, for example, when water distribution line 118 (valve 158) is open, all water distribution lines below it, that is, water distribution lines 116, 114, 112, 110, also remain open. It is important that substantially equal amounts of water flow through each open water distribution line. This insures a homogeneous temperature throughout the water filled portion of the reactor, without any temperature gradient and with minimal turbulence. Similarly, oil is continually introduced through all oil distribution lines that remain open. Thus, when water distribution line 118 is open, oil distribution lines 70, 68, 66, 64, 62, 60, have been shut off, but the remaining (and higher) oil distribution lines 72, 74, 76 remain open, and each of these lines continues to introduce freshly cooled oil into tank 12, thereby maintaining a constant, uniform, preselected temperature in the range of about −10° to 20° C. in the oil-filled zone of tank 12, preventing the reactive mixtures in the oil-filled, or cold zone, from reacting and minimizing turbulence.

The interface between the oil and water is shown at 170 of FIG. 1. Here, water distribution line 114 is the highest water line that is open, and oil distribution line 68 is the lowest oil distribution line that is open, preserving a dead zone of extremely low turbulence at the very site of the initialization of the chemical reaction, thus providing a sharper demarcation between hot and cold zones and insuring that the reaction proceeds only at the predetermined rate. There is very little turbulence generated by the flow rates used in the process. In practice, oil distribution lines and water distribution lines are spaced about two feet apart along the length of tank 12. Within reason, the closer together adjacent distribution lines are, the more uniform the temperature will be.

Additionally, there is very little mixing of the oil and water, and the interface of the oil and water is probably less than one inch thick, providing a very sharp demarcation between reacting components of the reactive mixture and non-reacting components of the mixture.

In practice, it has been found that any mixing of the oil and water that might otherwise occur is reduced, and therefore the separation of hot and cold zones is enhanced, by preserving a zone above the top of the water into which cold oil is not pumped. This is referred to as a dead zone because it experiences even less turbulence than other portions of the reactor. Referring to interface 170 of oil and water in tank 12, as illustrated in FIG. 1, the dead zone is between water distribution line 114 (the highest water distribution line that is open) and oil distribution line 68, and is created by closing oil distribution lines 64, 66, resulting in one dead station, that is neither oil line 66, nor water line 116, is turned on. This dead zone moves progressively upward throughout the reaction process and its use leads to superior quality control.

Thus, if water is being introduced through water distribution line 114, and below, then cold oil is pumped into the reactor from oil distribution lines 76, 74, 72, 70, 68, but not through oil distribution lines 66, 64, (directly opposite water distribution line 114). As the water level in the reactor rises, an oil line one level higher than the highest water distribution line is shut off, creating the dead zone.

In practice, the level of water within tank 12 is raised at a preferred rate of about six inches to about twenty-four inches per hour by feedwater metered through regulator 136, so that reacting a the full length of a thirty foot reactor 10 takes about thirty hours. This time can be shortened somewhat by addition of accelerators to the reactive mixtures.

The hot water initiates the reaction and then carries away the excessive heat of reaction, insuring the the reactive mixture is always at the optimal temperature for a particular reaction. After the reaction has proceeded to substantial completion, it does not matter that the polymer or co-polymer is maintained at the reaction temperature.

Optical switch 202, located inside tank 12 near the top of tank 12, is located near headspace 142. When water rises to the level of optical switch 202, an electric signal from optical switch triggers a relay that closes valve 200 (which shuts off oil overflow line 40) and closes oil circulating valve 204, and feedwater control valve 206, making tank 12 and the water circulating system a single closed unit. Simultaneously, the signal from optical switch 202 turns off oil pump 33 and changes the setting of the thermostat that controls the temperature of the water heated by water heater 100 and sets a timer that maintains the new thermostat setting for a predetermined time.

Then, water at the new temperature, typically 10° C. to 20° C. hotter than the reaction temperature, circulates throughout tank 12, permitting the polymer or copolymer to cure, that is, providing additional time for the reaction to proceed further toward completion. By the time tank 12 is full of water and the oil circulation system has been entirely turned off, the product of reaction, which is now a light conduit, is very viscous and higher temperatures are required to impart sufficient mobility to the unreacted molecules to permit them to react. Typical cure periods and temperatures are provided in the examples below.

Figure 2:
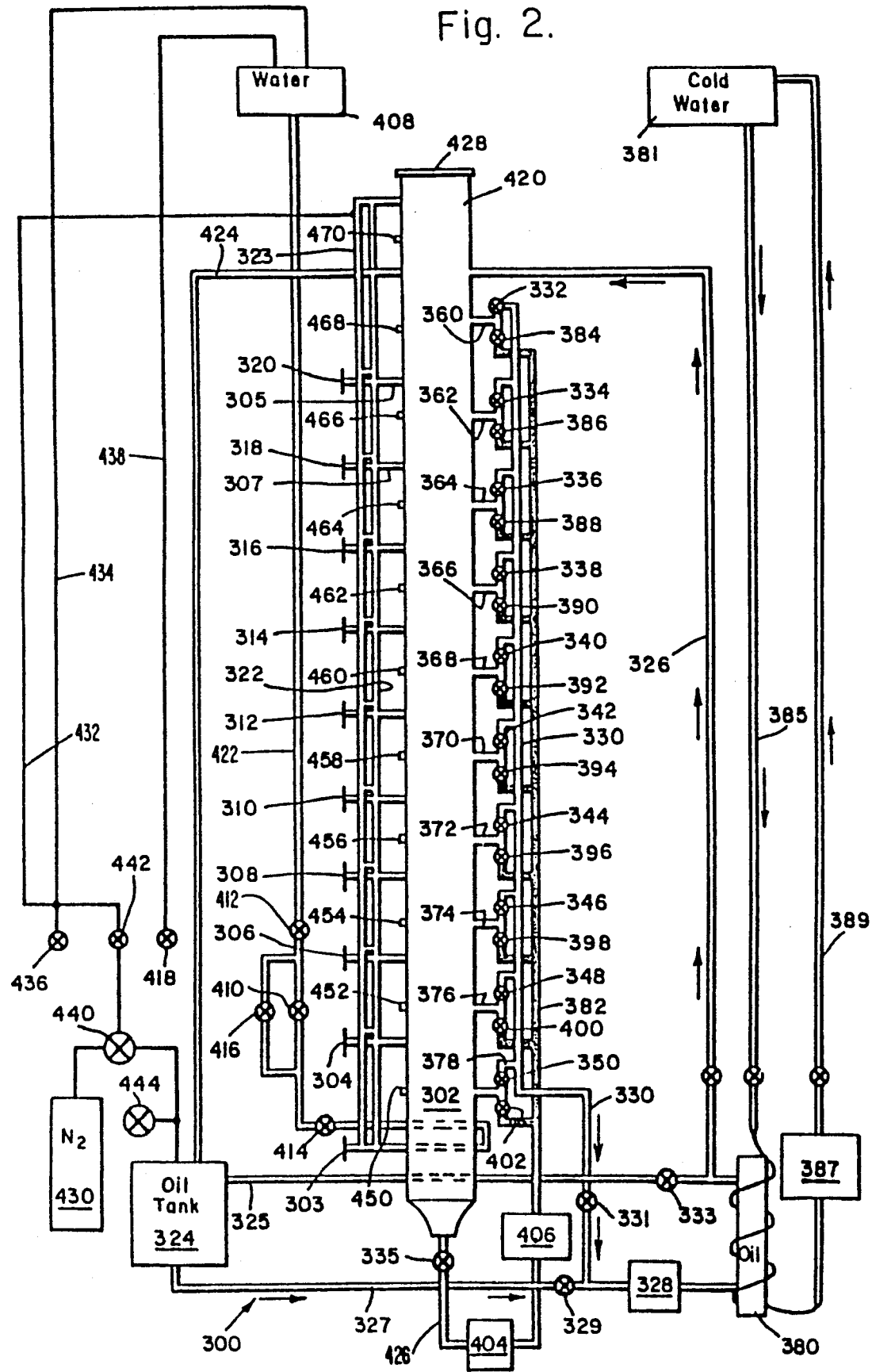
FIG. 2 is a schematic side elevation of an alternative embodiment of an apparatus for carrying out the disclosed methods.

It has been found, however, that although the apparatus described in FIG. 1 is suitable for many products, it does not permit sufficient temperature control to insure high quality in products for certain applications. Therefore, the embodiment illustrated in FIG. 2 was developed. The principal difference between the apparatus of FIG. 1, and the apparatus of FIG. 2 is that the latter removes oil from the tank through the same pipes that water is pumped into the tank. At certain times, water will flow through the pipes into the tank. And at other times, the oil will flow out of the tank through the same pipes, respectively.

Referring to FIG. 2, there is shown a reactor 300 having a tank 302, which may be of the same dimensions as the previously discussed embodiment.

Thermometers 304, 306, 308, 310, 312, 314, 316, 318, 320, operatively connected to the fluid within tank 302, through standoff tubes (for example, standoff tubes 305, 307; others un-numbered for clarity) and sealed therein through associated sealing means, allow the temperature within tank 302 to be measured at regular intervals. Sight glass 322 is disposed parallel to the longitudinal axis of tank 302 throughout its length, permitting direct observation of the level of water and oil within tank 302. Communicating therewith and parallel thereto is sight glass equalizer line 323 for insuring equal pressures throughout length of sight glass 322 and allowing bubbles to rise, permitting better observations.

Cold oil from oil tank 324 is pumped through oil lines 325, 326 by oil pump 328 in the direction of the arrows (upward) into tank 302 near its top. Cold oil is sucked out through oil outlet manifold 330, which includes oil 348, 350, each of which is operatively connected to fluid distribution lines 360, 362, 364, 366, 368, 370, 372, 374, 376, 378, which communicate openly with the interior of tank 302 at all times. The oil is sucked through the fluid distribution lines; through oil distribution valves; then it is cooled in oil cooler 380 immediately after passing through oil pump 328 for recycling through tank 302. Oil cooler 380 is a conventional water coupled chiller unit, shown as chilled water tank 381 (which is cooled by a conventional refrigerator unit (not shown), connected to heat exchanger, through water line 385, pump 387, and through water line 389. The temperature of the water in cold water tank 381 is controlled by means well known in the art.

It has been found that withdrawing the oil through oil outlet manifold 330, rather than pumping the oil into tank 302 through such a manifold, improves circulation of the oil, leading to better temperature control and, since oil pump 328 is lower than tank 302, eliminates the possibility that oil pump 328 might be pumped dry.

Water distribution manifold 302, connected to fluid distribution lines 360, 362, 364, 366, 368, 370, 372, 374, 376, 378 by respective valves 386, 388, 390, 392, 394, 396, 398, 400, 402 is operatively connected to water pump 404, which is connected to water heater 406. Water pump 404 pumps hot water through water distribution manifold 382 and through any water valves that are open, into tank 302. Water in tank 302 leaves tank 302 through water return line 426 (and maintenance valve 335, normally open), at the bottom of tank 302, from which it returns to water pump 404 and water heater 406 for recirculating through water distribution manifold 382 and tank 302.

Oil may be cooled to operating temperature while in oil tank 324 (prior to being pumped into tank 302, by circulating the oil through oil line 325, through oil pump 328, oil cooler 380, and back into tank 324 through oil cooler line 327, (that is, oil valve 329 is open, and oil valve 331 is closed, and oil valve 333 is open). (During the processing of a batch of fiber optics or other products, oil valve 329 is closed and oil valve 331 is open).

Oil is then pumped into tank 302 by means of oil pump 328. Alternatively, by opening and closing valves in proper sequence, the cold oil may be forced upward through oil overflow line 424 by nitrogen pressure from nitrogen tank 430, although this is a more expensive method.

Alternatively, tank 302 is filled with oil, which is chilled as it circulates in tank 302 until the desired operating temperature is reached. Then, tank 302 is filled with tubes of reactants, as described above. Unheated water from water reservoir 408 is metered into tank 302, through metering regulator 410. Isolation valves 412, 414, merely allow hydraulic isolation of metering regulator 410 and bypass valve 416, to permit maintenance or replacement of the latter two valves. Following production of a batch of product in reactor 300, tank 302 is filled with water, and must be emptied before another batch cycle can be started. In the embodiment illustrated in FIG. 2, this is accomplished through use of the nitrogen pressure head gas by opening nitrogen pressure release valve 418, permitting the nitrogen in head space 420 to push the water in tank 302 up through water metering line 422 into water reservoir 408, for use in producing the next batch. Water, however, cannot flow backward through metering regulator 410, hence bypass valve 416 is opened during this final portion of the cycle to enable the feedwater to return to water reservoir 408 through water metering line 422.

Excess oil within tank 302 flows through oil overflow line 424, and back into oil tank 324.

Operation of the embodiment illustrated in FIG. 2 parallels operation of the embodiment illustrated in FIG. 1. After tank 302 is filled with cold oil at the stable desired temperature and tank 302 is loaded with reactants, hatch 428 is sealed, tank 302 is pressurized to the desired pressure with nitrogen from nitrogen tank 430, through pressure equalizing line 432. Pressure equalizing line 434, operating through valve 436 applies an equal pressure to water reservoir 408; naturally valve 418 of depressurizing line 438 is closed. Valve 440 is also opened to allow nitrogen gas to escape from nitrogen tank 430, and to pressurize the entire system. Valve 442 is naturally open to allow pressurization of tank 302. The pressure within the entire fluid-dispersal system can be read from gauge 444.

Next, unheated water is metered into the bottom of tank 302 through metering line 422, and metering regulator 410. The water circulation system is turned on, drawing the metered water downward through water outlet line 426 in the bottom of tank 302 into water pump 404 and water heater 406, and back into tank 302 through water distribution manifold 382 and any water valves that are open. The operation of the apparatus according to FIG. 2 is the same as that described above with reference to FIG. 1.

As noted, however, in the embodiment of FIG. 2, both oil and water flow through the same fluid distribution lines, which reduces turbulence. In the present embodiment, turbulence within tank 302 is even further diminished by using only one fluid distribution line at each station to distribute both oil and water. The dead zone is maintained by turning off entirely one fluid distribution line at some point during the cycle of the process. That is, between the highest water valve that is open and the lowest oil valve that is opened, there is always one fluid distribution line that is closed; that is, there is always one fluid station closed during each phase of the process. For example, if oil distribution valve 342 is the lowest oil distribution valve that is open, then fluid distribution line 372 is shut off, carrying neither oil nor water, and water valve 398 is the highest water valve that is open. Any oil that remains in a fluid distribution line when the line is switched from sending oil out to pumping water in, is quickly flushed into tank 302 by the water entering tank 302 and floats on the water. It has been found that this arrangement permits the best temperature control and hence quality control that is known to the inventors. Very high quality control can be maintained with such a system, because there is a minimum of turbulence and a minimum of interaction between the water and the oil. In addition, the possible length of the tank is practically indefinite since the thermal coupling is so efficient.

Any fluids could be used for carrying out the present invention. For, for example, could be used. It is also possible to use a single fluid, such as water, within the tank of a reactor and to progressively heat the exterior of the tank while maintaining the remainder in a cold state. Thermocoupling is not as efficient in such an apparatus, however, and there are inefficiencies induced from thermal eddy currents within the fluid, which also blur the demarcation between hot and cold zones. These shortcomings make it difficult to control quality. Such reactor systems are described in greater detail in the comparative examples below.

These observations led to the two-fluid systems described in conjunction with the drawing Figures. Any two different fluids will work if (1) they are not soluble in each other and (2) one is less dense than the other. The preferred embodiments disclosed here, water and light oil, are the preferred fluids because they meet these two requirements so well.

This sequence of opening and closing of valves and so forth is identical to the system described above Thermoswitches, 450, 452, 454, 456, 458, 460, 462, 464, 468, detect the temperature shift from the cold oil at about −10° C. to about 0° C. to the hot water, which may be from 35° C. to about 65° C., and triggers certain process controls that sequentially open and close water and oil valves through relays, as described above.

Optical sensor 470 is triggered when water reaches it. When optical sensor is triggered, it causes metering valve 412 to close, preventing further water from entering tank 302; and turns on timer controls that control the temperature of the water, which is now involved in a closed loop comprising tank 302 and water distribution manifold 382, which pumps hot water in through all fluid distribution lines, and sets a timer for regulating the cure period.

One advantage of this method is that the reactive mixture shrinks as it is reacted progressively upwardly, eliminating the possibility of voids from non-uniform shrinkage, because the unreacted mixture remains flowable. Therefore, when a portion of the mixture shrinks, the unreacted material simply falls down the tube, maintaining contact with the reacting interface. Even though total shrinkage is in the range of about 8 to 18% or up to 25% of the volume of the reactive mixture, this shrinkage creates no voids in a light conduit made by process according to the present invention. (This shrinkage also means that the entire light conduit is bathed in hot water, even though optical switch 470 is below the top of the tubes containing the reactive mixture.

The reactor may be oriented in any position that allows the unreacted mixture to flow downwardly, and allows the oil to float on water. It has been found, however, that even when carefully controlled, bubbles occasionally form within the reactive mixture. By inclining the reactor at an angle of about 30–45% from the horizontal, however, the defects in the final product that may result from bubbles are localized because the bubbles will not rise through the reacting and unreacted mixture. If the reactor were completely vertical, any bubbles that form would rise further, creating greater length of defective and perhaps unusable light conduit.

A primary purpose of the reactor is to create and maintain the optimal reaction temperature progressively along the length of a forming light conduit, while maintaining the unreacted mixture at a lower, non-reactive temperature, to prevent formation of voids.

The reactor described herein, especially regarding the preferred embodiment illustrated in FIG. 2, constitutes the best mode contemplated by the inventor for practicing the process of the invention, since it achieves excellent temperature coupling, and hence control, over the reactant mixture.

An alternative embodiment of the apparatus includes a reactor-tube having a plurality of separate circumferential fluid conducting coils distributed at intervals along the length of the reactor on its outer surface. The reactor is filled with a heat conducting liquid, such as water or oil, at a low temperature. Alternatively, it is also possible to use stagnant or circulating air to control and maintain the low temperatures in the reactor, although air obviously provides less efficient heat coupling than oil or water. Cold liquid, such as water or oil, is circulated through the coils, which may be advantageously placed on the outside of the reactor in close contact therewith, to maintain the temperature of the interior of the reactor. To induce and control the reactor, hot liquid, such as water, is circulated through progressively higher coils along the reactor, raising the temperature of a portion of the tubes of reactive mixture, and causing polymerization. As the hot zone is moved upwardly along the reactor, the cold zone is shrunk by reducing concomitantly the coils carrying cooling fluid. The temperature coupling of such an apparatus is not as good as that described above, but it can produce high quality light conduits.

The method and apparatus described herein may be conveniently employed to produce thermoplastic or thermoset rods, pipes, tubes and other articles whereby the cross-section radius is considerably smaller than the length. It may also be used as a replacement for currently used casting techniques used in production of bars, rods and the like of polyacrylics, polycarbonates and the like.

To improve the resulting light conduit further, it is desirable to use a sheath or cladding material whose interior is very highly polished, clean and free of scratches. Any imperfection in the smoothness of the inner walls of the cladding will be reproduced in the outer surface of the light conduit and may be exaggerated, due to the reactive mixture's being dragged across such imperfection as the reactive mixture shrinks during polymerization. This effect may cause striation on the light conduit. A suitable cladding is an FEP Teflon tube, extruded on conventional extrusion equipment using highly polished mandrels. Other potential cladding includes, for example, polyvinyl chloride, which is more flexible than teflon, but has optical properties that render it currently less desirable to light conduit cladding, since its use results in severe light leakage.

As discussed above, simultaneous exposure to high temperature and oxygen oxidizes a thermoset plastic light conduit, causing it to deteriorate. Since significant oxidation only occurs at temperatures above 150° C., however, it is not typically a concern, except at the end of the light conduit into which a light is shown (that is, the light receiving end). It has been found that enclosing the light receiving end of the light conduit in a glass envelope that is sealed from the air prevents any significant oxidation, since once the limited amount of oxygen in the tube is exhausted, there is no more oxygen to react with the light conduit. Because of the exceptional heat resistance of a light conduit according to the present invention, the additional heat transmitted into the light conduit through infra red transmission by the glass does not harm the light conduit.

A thermoplastic light conduit enclosed in a glass enclosure, however, shrinks and melts upon exposure to the heat of the lamp. The melted polymer has a different refractive index than the body of the polymer, which causes unacceptable light scattering. Furthermore, the spacial relation between the core and sheathing is changed when the polymer melts which, also reduces the ability of the light conduit to transmit light.

The following examples describe the starting mixtures, the methods and reaction parameters used, and the characteristics of the resulting light conduits, as actually manufactured according to the present inventions, as described above. The following examples are illustrative of but a few of the many possible arrangements of chemicals and process parameters that could be employed to create light conduits having various characteristics.

EXAMPLE 1

A light conduit was prepared as follows: a mixture of:

| | |
|---|---|
| 70 parts | Methyl methacrylate |
| 30 parts | n-Butyl methacrylate |
| 5 parts | Diallyl phthalate |
| 0.5 parts | n-butyl mercaptan |
| 0.5 parts | Benzoil peroxide |

These chemicals were mixed, filtered, deaired, and sucked into a 50 foot long FEP (Fluorinated Ethylene-Propylene copolymers, product of E.I. DuPont, refractive index of 1.34) tube with a 0.25" inside diameter.

The tube was bent into a U-shape and placed in a 25 foot reactor filled with oil at the temperature of approximately 0° C. The reactor was sealed and pressurized to 80 psi with nitrogen. Water at 80° C. was metered into the reactor at a rate such that the water level inside the reactor rose one foot per hour. Thus, the mixture in the length of tube was progressively heated and reacted over a 20 hour period under nitrogen pressure of 80 psi.

The temperature was then raised to 90° C. and maintained at 90° C. for two hours. Then the temperature was increased to 100° C., which was maintained for two hours.

This example produced two sections of usable light conduit, each about twenty feet long, after shrinkage during polymerization. (The bottom U-shaped portion of the tube, formed when it is doubled to fit into the reactor, is not usable and a portion of the length of the tube is also lost due to this bending.) The excess tubing, which is essentially empty after the reaction, was cut off. Impurities and unreacted chemicals were observed at the top of the solid matter in both sections of the tube, indicating that at least some of the few impurities remaining after purifying are forced upward by the advancing network polymer, improving the uniformity and quality of the finished light conduit.

The resulting light conduit transmitted light fairly well. A very slight yellow tint was observed, probably due to the benzoil peroxide residues. The material did not flow when exposed to temperatures of above 150° C.

A separate one-inch long sample section of the core material was placed in each of the following solvents: acetone at room temperature, acetone at 50° C., tetrahydrofuran at room temperature, methyl ethyl ketone at room temperature, methyl ethyl ketone at 50° C. and methyl methacrylate at room temperature, for 24 hours, to measure the extent of cross-linking. The samples swelled in all solvents, but did not dissolve. (Of course, the degree of swelling was higher in heated solvents compared to their counterparts at room temperature.) The degree of swelling was highest in methyl methacrylate, probably due to the compatibility of the major constituent: methyl methacrylate monomer (see formulation, 70 parts methyl methacrylate monomer per 110.5 part of ingredients) to its precursor. These tests indicate that a degree of cross-linking was achieved.

EXAMPLE 2

Example 1 was repeated, but with a different formulation, which is:

| | |
|---|---|
| 70 parts | methylmethacrylate |
| 25 parts | n-butyl methacrylate |
| 10 parts | 1,3 butylene dimethacrylate |
| 0.5 parts | n-butyl mercaptan |
| 0.5 parts | benzoil peroxide |

The light conduit essentially had the same characteristics as the light conduit in Example 1.

EXAMPLE 3

Example 1 was repeated, but with a different which is:

| | |
|---|---|
| 70 parts | Methyl methacrylate |
| 30 parts | Ethyl Acrylate |
| 5 parts | Diallyl phthalate |
| 0.5 parts | n-butyl mercaptan |
| 0.5 parts | benzoil peroxide |

The resulting light conduit essentially had the same characteristics as the light conduit in Example 1. The core was marginally softer because ethyl acrylate homopolymer has a lower glass transition temperature than n-butyl methacrylate homopolymer, that is, −29° vs. 15° C.

EXAMPLE 4

Example 1 was repeated, but with a different formulation, which is:

| | |
|---|---|
| 50 parts | Methyl Methacrylate |
| 30 parts | Isopropyl Methacrylate |
| 20 parts | n-butyl methacrylate |
| 10 parts | 1,3-butylane dimethacrylate |
| 0.5 parts | n-butyl mercaptan |
| 0.7 parts | benzoil peroxide |

The resulting light conduit had substantially the same characteristics as Example 1. The amount of initiator was higher to compensate for use of the less reactive isopropyl methacrylate and n-butyl methacrylate vs. methyl methacrylate. Use of a greater amount of initiator resulted in a more noticeable yellow tint.

EXAMPLE 5

Example 1 was repeated, but with a different formulation, which is:

| | |
|---|---|
| 70 parts | styrene |
| 30 parts | vinyl acetate |
| 5 parts | Diallyl Phthalate |
| 0.5 parts | n-butyl mercaptan |
| 0.5 parts | Benzoil peroxide |

Not as efficient as the light conduit in Example 1, probably because of the vinyl acetate, which has a lower refractive index and light transmission capability as a homopolymer compared to acrylic or methacrylic esters.

Pliability, however, was slightly better than the light conduit in Example 1, but very comparable to the light conduit in Example 2. The light conduit of this Example 5 had less of a yellow tint than the light conduit of Example 1, probably because of the higher reactivity of vinyl acetate compared to n-butyl methacrylate.

EXAMPLE 6

Example 5 was repeated, but with a different formulation, which is:

| | |
|---|---|
| 70 parts | Styrene |
| 30 parts | n-butyl methacrylate |
| 5 parts | Diallyl Phthalate |
| 0.5 parts | n-butyl mercaptan |
| 0.5 parts | Benzoil peroxide |

The resulting light conduit was similar to light conduit in Example 5, except it possesses better light characteristics due to higher light transmission and refractive index of n-butyl methacrylate compared to vinyl acetate.

EXAMPLE 7

Example 1 was repeated, but with a different formulation, which is:

| | |
|---|---|
| 70 parts | methyl methacrylate |
| 30 parts | n-butyl methacrylate |
| 5 parts | Triallyl cyanurate |
| 0.5 parts | n-butyl mercaptan |
| 0.5 parts | Benzoil peroxide |

The resulting light conduit was similar to the light conduit in Example 1, except it was marginally harder due to the higher degree of cross-linking caused by triallyl cyanurate compared to diallyl phthalate. A predetermined volume of the core of the light conduit in Example 7 swelled considerably less in the solvents listed with Example 1 than the same volume of the core of the light conduit in Example 1, confirming a higher degree of cross-linking.

Samples from Example 1 and from Example 7 were immersed in methyl methacrylate for two days at room temperature. Samples where the amount of triallyl cyanurate was increased to 10 and 15 parts exhibited progressively less swelling and essentially no swelling with 15 parts of triallyl cyanurate, but the light conduit with 15 parts of triallyl cyanurate was very hard and did not transmit light as well as the light conduits with less amounts of triallyl cyanurate probably due to low light transmission capabilities of triallyl cyanurate.

EXAMPLE 8

Example 1 was repeated, but with a different formulation, which is:

| | |
|---|---|
| 70 parts | methyl methacrylate |
| 30 parts | n-butyl methacrylate |
| 5 parts | Diallyl phthalate |
| 0.5 parts | n-butyl mercaptan |
| 0.5 parts | Isopropyl peroxide |

The reaction was very sluggish at 80° C., so the reaction temperature was raised to 100° C. and pressure to 100 psi, with successive post-curings at 110° C. and 120° C. each for two hours. The resulting light conduit was very similar to the light conduit in Example 1. Some bubbles were observed, probably as a result of the high polymerization temperature. Smaller amounts of Isopropyl peroxide down to 0.3 could also be used with essentially the same results.

EXAMPLE 9

Example 1 was repeated, but with a different formulation, which is:

| | |
|---|---|
| 70 parts | Methyl methacrylate |
| 30 parts | n-butyl methacrylate |
| 5 parts | Diallyl phthalate |
| 0.5 parts | n-butyl mercaptan |
| 0.5 parts | phenylacetyl peroxide |

The initiator phenylacetyl peroxide is very unstable compared to the initiator benzoil peroxide, as evidenced by its half life of 0.000476 seconds in benzene at 20° C.

The light conduit produced by this Example 9 exhibited many imperfections, such as bubbles and voids, which can be attributed to premature polymerization, a fast rate of polymerization and subsequent heat removal problems, or polymerization of more reactive components such as methyl methacrylate without substantial copolymerization of the other monomers.

Subsequent experiments with the formulation of Example 9 were performed with addition of a substantial amount of n-butyl mercaptan, which assisted in containing the vigorous reaction, but the core of the light conduit was still very mushy and yellow.

EXAMPLE 10

Example 1 was repeated except that benzoil peroxide was substituted by diisopropyl peroxy-dicarbonate, a product of PPG Industries, Inc., Organic Chemical Divisions, marketed as IPP. IPP, received as a frozen block, decomposes very rapidly into free radicals at room temperature, making it explosive, so that it must be stored at −40° C. at all times. But IPP is extremely difficult to handle while frozen.

Therefore, a more controllable batch is prepared by dissolving a frozen block of IPP in a relatively slow reacting monomer in the proportion of about 10 parts by weight monomer to 1 part by weight of IPP. A suitable monomer for this task is diethylene glycol bis (allyl carbonate) which is manufactured by PPG Industries, Inc. Organic Chemical Division and marketed as CR-39. When dissolved in the less active monomer, CR-39, the isopropyl percarbonate can be handled more safely, but still should be stored at −40° C. for safety.

Therefore, the 0.5 part benzoil peroxide was substituted with 0.5 part IPP and 5 parts CR-39. An excellent light conduit was prepared with this recipe. Further, the polymerization reaction was carried out at the significantly lower temperature of 45° C. compared with 80° C. for benzoil peroxide. The post polymerization temperatures are 50° C. for two hours and 60° C. for another two hours. The yellow tint observed with conduits prepared using benzoil peroxide were not present in conduits employing IPP.

EXAMPLE 11

A light conduit was prepared as follows:

40 parts Methyl methacylate
30 parts n-butyl methacrylate
30 parts diethylene glycol bis (allyl carbonate)
5 parts diallyl phthalate
0.5 parts n-butyl mercaptan
5 parts 10% by weight of isopropyl percarbonate in diethylene glycol bis (allyl carbonate)

The reaction conditions were similar to Example 10. An excellent light conduit was prepared. The light conduit core exhibited better texture compared to Example 10. Further, the core withstood higher temperatures compared to the previous examples. This is caused by higher degree of cross-linking of the polymeric mass because of cross-linking effect of diethylene glycol bis (allyl carbonate).

EXAMPLE 12

Example 11 was repeated but 10 parts of triallyl cyanurate was substituted for 5 parts diallyl phthalate. The light conduit was not as flexible as Example 11, but withstood much higher temperatures.

EXAMPLE 13

Example 12 was repeated but 30 parts methyl methacrylate and 40 parts diethylene glycol bis (allyl carbonate) was employed. The light conduit was even less flexible than example 12, but could withstand much higher temperatures, excess of 200° C.

EXAMPLE 14

Example 11 was repeated except that n-butyl mercaptan was substituted by 0.5 parts of lauryl mercaptan. The light conduit exhibited the same characteristics as the light conduit in Example 11. In fact no significant difference could be observed when other mercaptans such as sec-butyl mercaptan, tert-butyl mercaptan or dodecyl mercaptan were included in the formulations in approximately the same ratios.

EXAMPLE 15

Example 11 was repeated except that methyl methacrylate was substituted by styrene. The same results were obtained. The reaction time was increased—the water was raised at one foot per 75 minutes—to compensate for the less reactive styrene with other ingredients. Styrene derivatives such as alpha-methyl styrene, p-phenyl styrene, 4-tert-butyl styrene could be successfully included in the recipe in ratios of up to 25 part derivative to 75 part styrene.

EXAMPLE 16

A light conduit was prepared as follows:

80 parts diethylene glycol bis (allyl carbonate)
10 parts vinyl acetate
10 parts triallyl cyanurate
10 parts (of 10% by weight of isopropyl percarbonate in diethylene glycol bis (allyl carbonate))

The polymerization reaction was very slow—the water inside the reactor was raised at 1 foot per two hours—the reaction temperature was raised to 55° C. while the pressure was maintained at 80 psi.

The resulting light conduit transmitted light fairly well, but not as well as the light conduit in Example 11. The core material was mushy. The post curing of the core at 70° C. for two hours and 90° C. for two hours resulted in a more consistent material. Nonetheless, the light conduit was inflexible. It could, however, withstand temperatures as high as 240° C.

COMPARATIVE EXAMPLES

COMPARATIVE EXAMPLE 1

Example 1 was repeated except that no cross-linking agent (diallyl phthalate) was included in the formulation. The tip of the resulting light conduit was placed in the focal point of a quartz halogen lamp having a focusing reflector—the same procedure that was used with the light conduit in Example 1.

The light conduit was examined in two ways: first, the tip of the light conduit was naked (no "glass cap"); second, with "glass cap". In the first exercise, the core of the light conduit shrank, melted and seemed to decompose. Within seconds of turning on the lamp, the odors of methyl methacrylate and n-butyl methacrylate were pronouned, indicating decomposition of the material. In fact the quartz halogen lamp had to be turned off to avoid a fire. The light conduit lost all ability to transmit light in the same period.

In the second exercise (with the "glass cap") the core of the light conduit shrank and melted. This time the melt was contained in the "glass cap". The ability of the light conduit to transmit light deteriorated very fast due to the difference in refractive indices of the molten polymer and the solid polymer, which resulted in substantial light scattering at the interface. As it melted, the light conduit pulled away from the lamp and changed the spacial relationship between the polymer core and the sheathing FEP. After twenty minutes, the smell of methyl methacrylate became prevalent, indicating that the polymeric core was decomposing into its oligomers and subsequently into monomers. In fact, bubbles in the molten mass created by the boiling of the monomers were easily observed within the glass cap. The quality of the light conduit was fairly good at the beginning of the exercise, but started to deteriorate progressively within the 20 minutes. In fact, up to 90% of the light was lost in the first 10 minutes.

The same two exercises with samples prepared according to Example 1 resulted in the following: the naked light conduit showed no sign of deterioration in the first hour. After one hour, the first one to two inches of the core was harder, indicating that the energy of the lamp was causing the polymeric core to cross-link more and/or the polymerization achieved absolute completion. Subsequent exposure to the quartz-halogen lamp resulted in the loss of material. Up to ¼ inch of core material was lost over a six hour period, indicating that the high heat of the lamp was causing decomposition of the material. Obviously, the rate of decomposition of the cross-linked core was much lower than the linear polymeric core.

In the second exercise, the light conduit was sheathed in the glass cap and placed in the focal point of the lamp. After one hour, the first two inches of the core were harder, similar to the previous exercise. Subsequent exposure resulted in loss of material but at a much slower rate—it took ten days of constant exposure to cause a ¼ inch material loss.

In all of the exercises above, a rotating fan blade transverses between the lamp and the tip of the light conduit.

COMPARATIVE EXAMPLE 2

A light conduit prepared according to the conditions set in Example 11 was subjected to similar exercises as discussed in Comparative Example 1.

The light conduit was examined again in two ways: first, the tip of the light conduit was naked (no "glass cap"); second, with "glass cap". The naked conduit shrank but to a very small extent compared to the cross-linked light conduit under the same conditions as set forth in Comparative Example 1. Further, the light conduit showed no sign of deterioration in the first 120 hours compared to 1 hour for the light conduit in Comparative Example 1. After 120 hours, however, loss of material and slight yellowing of the surface of the light conduit was noticed. It seemed that the decomposition of material was caused by oxidation of the polymeric mass upon the exposure to the high intensity quartz halogen lamp and subsequent loss of the oxidated polymer. This effect was further confirmed by the movement of yellow surface away from the lamp. The decomposition nonetheless was markedly slower than for the conduit as set forth in Comparative Example 1.

In the second exercise, the light conduit was sheathed in the glass cap and placed in the focal point of the lamp. After comparatively long exposure of 120 hours, no loss of material was noticed, but the core had shrunk a very minute amount. The most striking observation, though, was that no yellow tint could be noticed on the surface of the polymeric core, indicating absence of oxidation. The polymeric core, in fact, showed no loss of material for constant extended exposures, in excess of 100 days. This may be attributed to two factors, first, the high degree of cross-linking caused by high concentration of diethylene glycol bis (allyl carbonate) and diallyl phthalate; second, diethylene glycol bis (allyl carbonate) as a homopolymer, can withstand much higher temperatures compared to methyl methacrylate and/or n-butyl methacrylate as homopolymers.

COMPARATIVE EXAMPLE 3

The formulation from Example 11 was employed to prepare light conduits using three different reactors. The reactor 1 was constructed such that no oil was used and the two media inside the reactor consisted of air on top of water. The water was static and was heated by external means. The water level was raised one foot, then heated to the desired temperature and maintained for one hour, then raised again, heated and maintained. The air volume was cooled by external means (cold water at approximately 5° C. was constantly circulated within copper coils wrapped around the reactor). As the water was raised, the air volume shrank and accordingly the external cooling coils were shut off. A 20 foot light conduit was prepared.

The second reactor was constructed such that, heated water was circulating within the reactor, but the oil on top of it was static and cooled externally (cold water at approximately 5° C. was constantly circulated within copper coils wrapped around the reactor). The water was raised progressively at 1 foot per hour and the oil volume subsequently shrank by the same volume, and the cooling coils were turned off in the portion of the tank where water replaced oil.

The third reactor was constructed according to the preferred embodiment of the present invention. The oil could be circulated at lower temperatures (−5° C. to −10° C.) due to no icing, compared to water.

The sample as prepared in the first reactor exhibited numerous voids and bubbles, probably due to inefficient heat removal from two sources: first, the exothermic heat of reaction within the conduit, which travels upward; secondly, the conductive heat transmitted from the water surface into the air. These heats cannot be efficiently removed due to the low heat conductivity of air and the inefficient heat removal construction of the reactor.

The sample as prepared in the second reactor exhibited minor bubbles but was markedly better than the sample prepared in the first reactor. The bubbles were probably caused by the heat of reaction traveling upward within the conduit and not being removed by the cold static oil. The heat of reaction cannot be easily removed because in a static medium such as the oil volume in the reactor localized heat buildup is considerable and cannot easily be conducted outward, partially due to the viscosity of the oil, which results in less prevalent convection currents.

The sample as prepared according to the present invention, however, resulted in an excellent light conduit completely free of bubbles or any other voids.

What is claimed is:

1. An apparatus for carrying out a polymerization reaction progressively over a length of reactants, comprising:
   a. a cylindrical tank having an exterior, an interior and a longitudinal axis inclined at an angle from vertical and sufficient to prevent bubbles rising through the reacting and unreacted reactants;
   b. means for sensing and maintaining the temperature of a portion of the interior of said tank below a first predetermined temperature that prevents the reactants from reacting, thereby providing a first zone having a first size and location within said tank;
   c. means for heating the interior of said tank and its contents progressively from one end to the other to a temperature above a second predetermined temperature, thereby providing a second zone having a second size and location within said tank; and
   d. means for controlling the temperatures in said first zone and in said second zone, whereby the means for sensing and maintaining the temperature of a portion of the interior of said tank below a first predetermined temperature, the means for heating the interior of said tank and the means for controlling the temperatures in said first zone and in said second zone function together as means for creating and maintaining a dead zone spatially and thermally separating said first zone from said second zone.

2. An apparatus according to claim 1 wherein said dead zone is maintained above the first zone and below the second zone.

3. An apparatus according to claim 1 wherein the total combined volume of said first zone, said second zone, and said dead zone is substantially equal to the total volume of said cylindrical tank.

4. A polymerization reactor comprising:
an elongated, cylindrical, pressurizable tank having a top and a bottom;
a means for recirculating a first fluid including a plurality of first fluid distribution lines which are located at intervals along the length of the tank and are in fluid communication with the interior of the tank and have a valve operatively positioned in each of the first fluid distribution lines;
a means for recirculating a second fluid including a plurality of second fluid distribution lines which are located at intervals along the length of the tank, are in fluid communication with the interior of the tank and have a valve operatively positioned in each of the second fluid distribution lines;
a means for pressurizing the interior of the tank comprising a valved inlet to the tank positioned at a level above the uppermost of the plurality of second fluid distribution lines; and
a means for withdrawing a volume of the first fluid from the top of the tank simultaneously with introduction of a volume of the second fluid into the tank near the bottom of the tank, including an inlet to the tank positioned at a level below the valved inlet to the tank for pressurizing the interior of the tank, the volume of withdrawn first fluid being substantially equal to the volume of second fluid introduced;
wherein the longitudinal axis of the tank is inclined from vertical so as to localize bubbles which may occur in a reactive mixture contained within containers in the tank.

5. The reactor of claim 4 further comprising a means for cooling the first fluid.

6. The reactor of claim 4 further comprising a means for heating the second fluid.

7. The reactor of claim 6 wherein the longitudinal axis of the tank is inclined from 30° to 45° from the horizontal.

8. The reactor of claim 4 further comprising:
a first fluid inlet near the top of the tank and in fluid communication with the interior of the tank and the means for recirculating the first fluid;
a second fluid outlet near the bottom of the tank and in fluid communication with the interior of the tank and the means for recirculating the second fluid;
whereby the first fluid distribution lines and the second fluid distribution lines are positioned between the inlet and the outlet.

9. The reactor of claim 4 further comprising means for sensing the temperature of the upper level of the second fluid inside the tank at locations between adjacent second fluid distribution lines and for generating signals for operation of the valves in each of the second fluid distribution lines in response to the temperature sensed and in accordance with a predetermined sequence.

10. The reactor of claim 4 further comprising a valve operatively positioned in each of the first fluid distribution lines and a means for sensing the temperature of the upper level of the second fluid inside the tank at locations between adjacent first fluid distribution lines and for generating signals for operation of the valves positioned in each of the first fluid distribution lines.

11. The reactor of claim 9 wherein the means for sensing location in the second fluid distribution lines is a plurality of optical switches or level sensors.

12. The reactor of claim 10 wherein the means for sensing location in the first fluid distribution lines is a plurality of optical switches or level sensors.

13. The reactor of claim 4 further comprising means to prevent fluid level inside of the tank from exceeding a predetermined height.

* * * * *